June 11, 1929.　　　　F. E. BEST　　　　1,716,913
RESILIENT CHASSIS SUSPENSION DEVICE
Filed Jan. 17, 1922　　　2 Sheets-Sheet 1
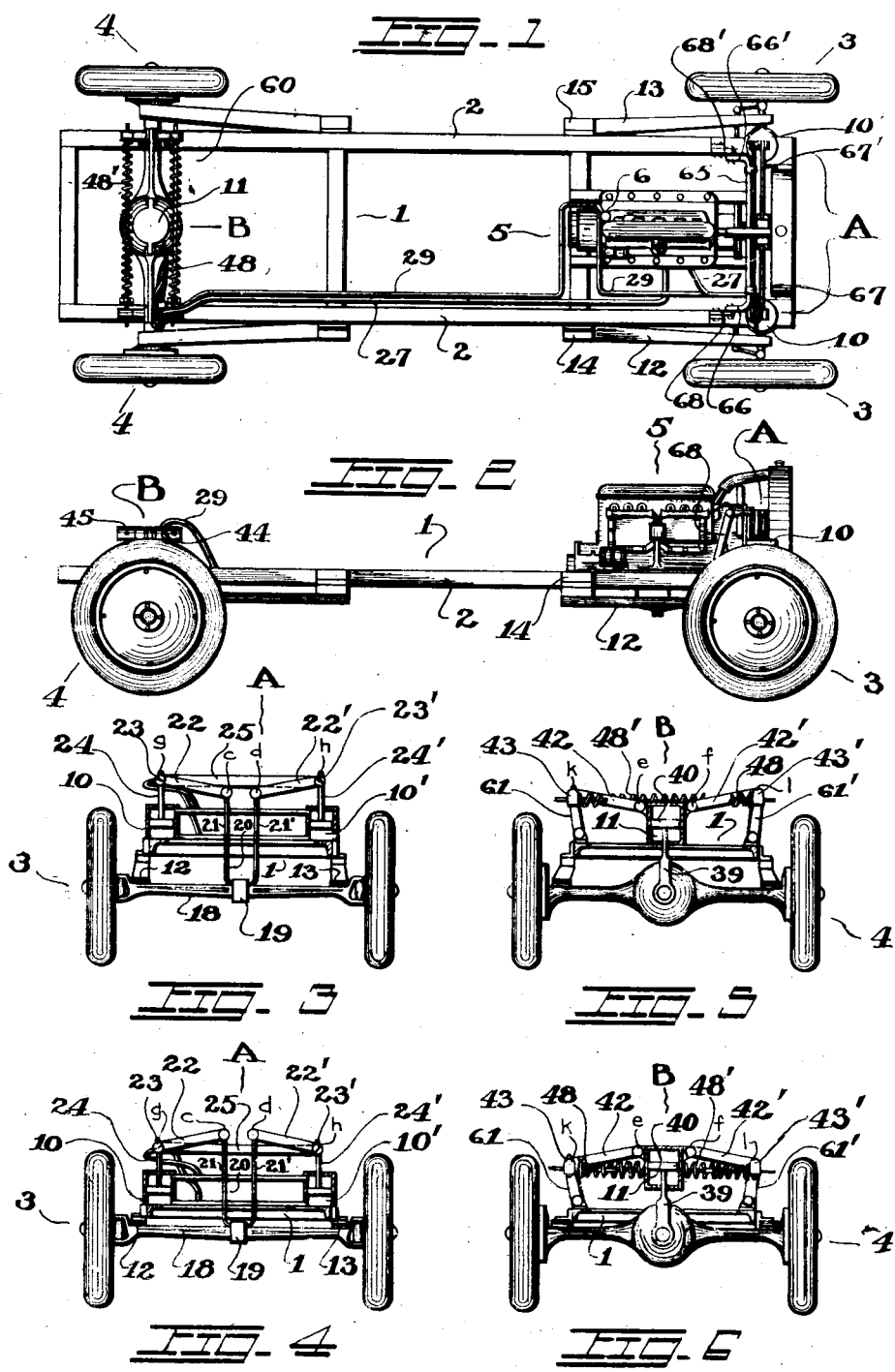

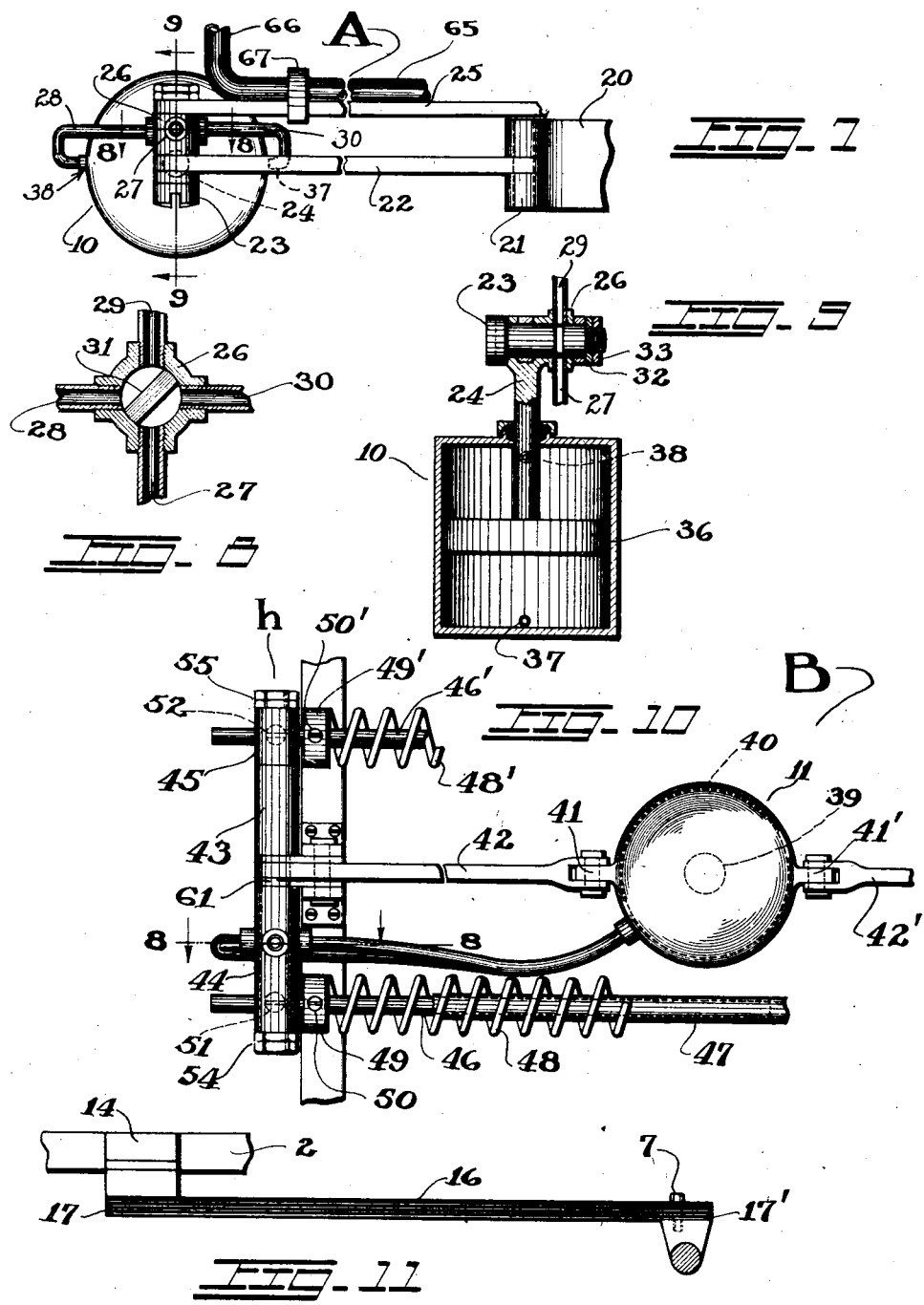

Patented June 11, 1929.

1,716,913

UNITED STATES PATENT OFFICE.

FRANK ELLISON BEST, OF SEATTLE, WASHINGTON.

RESILIENT CHASSIS SUSPENSION DEVICE.

Application filed January 17, 1922. Serial No. 529,831.

My invention relates to vehicle body suspension means, and its principal object is to provide automatic means for transforming the ordinary rapid oscillations of a vehicle, incidental to travel over rough or uneven surfaces into ultra slow resilient movements by extending said rapid oscillations over longer periods of time so that they will overlap and practically neutralize each other.

I attain this and other objects of the invention, in this instance, by mechanism illustrated in the accompanying drawings, wherein—

Figure 1 is a plan view of a vehicle chassis, illustrating a forward and rear adaptation of the present device which for convenience, I shall designate as "A" and "B", respectively.

Figure 2 is a side elevation of the same.

Figure 3 is a fragmentary section of the front under carriage, showing adaptation "A" under a momentary minimum load condition.

Figure 4 is a similar view, showing the same under a momentary maximum load condition.

Figure 5 is a fragmentary section of a rear under carriage, showing adaptation "B" under a momentary minimum load condition.

Figure 6 is a similar view, showing the same under a momentary maximum load condition.

Figure 7 is a detail fragmentary plan view of the adaptation "A".

Figure 8 is a sectional view taken on the line 8—8 in Figure 7.

Figure 9 is a sectional view taken on the line 9—9 in Figure 7.

Figure 10 is a detail fragmentary plan view of the adaptation "B."

Figure 11 is a side elevation of one of the main body supporting springs.

Referring more in detail to the drawings, 1 designates the vehicle chassis, as a whole, comprising a main body frame 2, under carriages 3 and 4, an engine 5, and the resilient units "A" and "B". Driven by the engine is a pump, designated at 6, which in this instance furnishes the hydraulic pressure for the compensating cylinders 10 and 10' and 11 used in connection with the present mechanism; the cylinders 10—10' being mounted vertically at the forward corners of the frame 2, and cylinder 11 being located centrally above the rear axle of the vehicle. The front end of frame 2 is supported resiliently from the under carriage by means of springs 12 and 13. These preferably are of the arrangement illustrated in Figure 11 and are mounted on brackets 14 and 15, respectively, that are bolted or otherwise secured to the frame. The leaves 16 of the springs are separated at their fixed ends by shimming strips 17 and, under an average load, the leaves should extend practically parallel to the body, as illustrated in Figure 11. The leaves are also shimmed at the free ends, where they are slidably secured by shoulder bolts 7 and shimming strips 17'. By this construction the reactance of the spring is the same in its upward as in its downward displacement. With an ordinary type of spring, it is possible in excessive movements for the free end of certain leaves to lose physical contact with the others and thereby change the total reactance of the whole system.

Attached to the axle 18, Figures 3 and 4, by means of a clamp 19, is a U-shaped spring 20, the legs of which extend vertically. This may be a single leaf spring, as illustrated, or otherwise, and pivotally fixed to the upper ends of its legs, 21 and 21' are the inner ends of links 22 and 22', the outer ends of which are pivotally connected to the upper ends of piston rods 24 and 24' extending upwardly from pistons operable within the compensating cylinders 10 and 10', respectively, secured to main frame 2. The links are connected to the piston rods by means of shouldered screws 23 and 23' (see Figures 7 and 9) to which they are keyed, and the latter are secured in position by lock nuts 32 and 33. A transverse bar 25, secured at its ends to the screws of the respective pistons, serves to counterbalance the horizontal thrust of the spring 20 through its upstanding legs 21 and 21' and serves to keep the piston rods parallel.

In order that the bar 25 may be kept parallel with the frame 2, a rod 65 is extended longitudinally thereof and secured to the bar pivotally by means of clips 67 and 67'. The ends of the rod 65 are turned at right angles thereto and are pivotally joined to up-standing rods 68 and 68', respectively, which in turn are pivotally fixed to the frame 2.

The action of this device is as follows:

When the vehicle body is at rest and the resilient means at equilibrium, links 22 and 22' are substantially horizontal and therefore convey no vertical component of force through said links between the body and the undercarriage, resulting from the outward pressure of the upstanding legs of spring 20;

but should there by any vertical displacement of the body and consequent momentary unbalanced equilibrium of springs 12 and 13 due to the unevenness of the road there would be produced, a change in the position of the links 22—22' relative to the bar 25, said links being inclined, by reason of movement of the inner ends of the same either above or below the medial line of the bar 25. When this occurs the outward pressure of the ends of the spring members 21—21' causes the links to have a toggle action, tending either to separate the body and axle or to move the body and axle closer together, depending on whether the inner ends of the links have been moved below or above the line of the bar 25. The spring 21—21' and links 22—22' thus tend to augment the normal displacement between the body and axle and further tend, very strongly, to resist the recoil of the springs 12 and 13 thereby tending to slow up the return of the body to the normal position. The vertical component of the spring 21—21' is slightly less than the otherwise unbalanced reactance of springs 12 and 13 to permit the return of all parts to normal, said return being very strongly retarded. The result of this retarding action is that successive shocks and deflections will overlap and tend to neutralize each other and the shocks due to ordinary travel will be spread out over longer periods of time, resulting in a slow and undulating movement of the body rather than a series of rapid shocks. At the rear, links 42—42' and springs 48—48' operate similarly.

In order to maintain the links 22 and 22' in a horizontal position when the system is in equilibrium under various load conditions compensating means are provided which in this instance consist of cylinders 10 and 10' containing a medium under pressure supplied by a pump 6, and acting on the pistons on the bottom ends of the rods 24 and 24' within the cylinders. The supply of this fluid is controlled by the opening and closing of valve mechanism located at the upper ends of the piston rods, as at $g$ and controlled by movement of the pivot bolts therein.

The construction is as follows:

Integral with the upper ends of the piston rods 24 and 24' (see Figures 7, 8, and 9), are projections 26, forming valve housings having openings at ninety degree intervals thereabout to which fluid tubes 27, 28, 29, and 30 (Figure 8) are secured. The tube 29 conveys fluid under pressure from pump 6. Tube 27 is a return tube and tubes 28 and 30 connect at 38 and 37, respectively, with the upper and lower chambers of the cylinders. The shoulder screws 23 and 23' in the piston rods act as valves and each has a valve portion 31 rotatable therewith, which due to oscillations of the under carriage relative to the body, momentarily acts to supply fluid either to the lower or upper chambers of the cylinders which effects the position of the pistons to tend to bring the pivot points $c$, $d$, $h$, and $g$, of the links, in line.

It also serves, to compensate for any change of the load.

The compensating element "B" is of a modified construction, but is basically the same as adaptation "A" and its function is theoretically the same.

In this construction the cylinder 11 is supported by links 42 and 42' that have their inner ends secured pivotally to lugs 41—41' on opposite sides of the cylinder and their outer ends keyed to bolt pivots 43 and 43'. These bolts are supported from the frame by pivotally mounted links 61 and 61'. A sleeve 44 encloses the bolt 43 and forms a housing to which inlet and outlet tubes, similar to those of the valve before described, are connected. Spring guide rods 46 and 46' slide into the spring guide tubes 47 with springs 48 and 48' comprising the resilient reaction element. Collars and set screws 49 and 49', 50 and 50', respectively, render the tension of the springs 48 and 48' adjustable. The bolt pivots 43 and 43' are held in position by two sets of lock nuts, 54 and 55. Screws 51 and 52 hold the ends of the spring guide rods and tubes 46—46', 47—47', respectively, in a secured position in relation to the end pivots, thereby causing the expansion to be taken up by the tubes and rods.

In the operation of this device when the vehicle is at rest or is moving over an even surface the springs 12 and 13 at the front and the corresponding springs at the rear may be deflected, due to load, but the links 22—22' and 42—42' will be substantially horizontal and substantially parallel to the lines of force exerted by respective springs 21—21' and 48—48'. If deflection of the body supporting springs occurs when the links 22—22' and 42—42' are horizontal, said links will be displaced from their horizontal position into an inclined position relative to bar 25 and rods 46—47 respectively and will exert a force, as hereinbefore explained, tending to augment the displacement from normal, and to very strongly resist the return to normal. This will slow up the operation of the vehicle springs resulting in successive small shocks neutralizing each other and giving the vehicle body an undulating movement, the recoil from one shock being partially neutralized by the next succeeding shock. The movement of the pistons in the cylinders 10,—10' will always compensate for changes in load and bring the links 22—22' and 42—42' substantially to a horizontal position.

Having thus described my invention, what I claim as new and wish to secure by Letters Patent of the United States of America, is:

1. In a vehicle, a frame, resilient means supporting said frame, means for substantially counterbalancing the reactive forces of said resilient supporting means during normal functioning, and automatic adjusting means for said counterbalancing means.

2. In a vehicle adapted to carry loads of different weight, the combination with an axle, a frame and resilient means supporting the frame from the axle of compensating means operating automatically to approximately balance the stress of said resilient supporting means upon said frame under various load conditions.

3. In a vehicle of the class described, an axle, a frame resiliently supported from the axle and means for imparting force to the frame in the direction of its displacement from a normal position relative to the axle.

4. In a vehicle of the class described, an axle, a frame, means resiliently supporting the frame from the axle, and means for imparting force to the frame in the direction of its displacement from a normal position relative to the axle, approximately in proportion to the distance of said displacement.

5. In a vehicle of the class described, the combination with an axle, a frame and resilient means supporting the frame on the axle, of means for imparting force to the frame in the direction of its displacement from a normal position relative to the axle and means for varying said normal position.

6. In a vehicle of the class described, an axle, a frame resiliently supported from the axle, a spring member fixed to the axle, a link connected with the said spring member for imparting force to the frame in the direction of its displacement from normal position, and means actuated by the link for shifting said normal position.

7. In a vehicle of the class described, the combination with an axle and a frame resiliently supported from the axle, of a spring device fixed to the axle and links having ends pivotally supported from the body and other ends pivotally connected with said spring device whereby vertical movements of the body upwardly or downwardly from a normal position are yieldably augmented.

8. In a vehicle of the class described, the combination with an axle and a body frame resiliently supported from the axle, of a U-shaped spring fixed centrally to the axle with its legs extending vertically, links pivotally fixed at their outer ends to move with the body and having inner ends pivotally fixed to the ends of the legs of said springs whereby vertical movement of the body upwardly or downwardly from normal position will be augmented.

9. In a vehicle of the class described, the combination with a vehicle axle and body frame resiliently supported from the axle, of a spring device fixed to the axle, a pair of substantially horizontal links having inner ends pivotally fixed to the said spring device, devices pivotally connected with the outer ends of the links and carried by the body and vertically adjustable relative to the body, and means automatically operable to effect said adjustment by movement of the links.

10. In a vehicle of the class described, the combination with an axle, a body frame resiliently supported from the axle and a source of pressure medium, of cylinders fixed to the frame and connected with the pressure medium, pistons movable in the cylinders having vertically extending piston rods, a U-shaped spring fixed centrally to the axle, a pair of links having outer ends fixed to the said piston rods and inner ends fixed to the arms of said spring device, and valve mechanism operable by the movement of said links for admitting the pressure medium into the cylinders to adjust the pistons so as to sustain the body at the same normal height.

11. In a vehicle of the class described, the combination with a supporting axle and a body frame resiliently supported from the axle, of hydraulic pressure supply cylinders fixed to the frame, pistons operable in the cylinders and having vertically extending piston rods, a U-shaped spring device fixed centrally to the axle with its legs extending vertically, a pair of links having their inner ends pivotally connected with the upper ends of the legs of the spring device, valve housings formed in the upper ends of the piston rods, return and supply conduits connected with said housings and with the pressure supply and other conduits from the housing to the upper and lower ends of the cylinders, valve bolts rotatably mounted in the valve housings and pivotally joining the outer ends of said links with the piston rods and rotatable by vertical movement of the vehicle body to control the flow of pressure medium into the cylinders to actuate the pistons to maintain the body at a normal height under different loads.

12. In a vehicle a frame, resilient means supporting said frame, and compensating devices connected with said frame and arranged to augment the displacement of the frame from the normal and resist the return movement of the frame toward the normal to thereby convert rapid oscillations into ultra slow resilient movements.

Signed at Seattle, Washington, this 10th day of January, 1922.

FRANK ELLISON BEST.